United States Patent
Ogunwumi et al.

(10) Patent No.: US 6,849,181 B2
(45) Date of Patent: Feb. 1, 2005

(54) MULLITE-ALUMINUM TITANATE DIESEL EXHAUST FILTER

(75) Inventors: Steven B. Ogunwumi, Painted Post, NY (US); Patrick D. Tepesch, Corning, NY (US)

(73) Assignee: Corning Incorporated, Corning, NY (US)

( * ) Notice: Subject to any disclaimer, the term of this patent is extended or adjusted under 35 U.S.C. 154(b) by 176 days.

(21) Appl. No.: 10/209,684

(22) Filed: Jul. 31, 2002

(65) Prior Publication Data

US 2004/0020846 A1 Feb. 5, 2004

(51) Int. Cl.$^7$ .................. B01D 39/20; B01J 21/02; B01J 21/06; B01J 21/12; B04B 35/478
(52) U.S. Cl. .............. 210/510.1; 55/523; 55/DIG. 30; 210/503; 501/80; 501/127; 501/128; 501/134; 501/153; 502/439; 502/527.19
(58) Field of Search .................. 501/80, 127, 128, 501/134, 153; 55/523, DIG. 30; 210/503, 510.1; 502/439, 527.19

(56) References Cited

U.S. PATENT DOCUMENTS

| | | |
|---|---|---|
| 2,776,896 A | 1/1957 | Harman et al. |
| 3,578,471 A | 5/1971 | Lachman |
| 4,329,162 A | 5/1982 | Pitcher, Jr. |
| 4,483,944 A | 11/1984 | Day et al. |
| 4,767,731 A | 8/1988 | Asami et al. |
| 4,855,265 A | 8/1989 | Day et al. |
| 5,288,672 A | 2/1994 | Gugel et al. |
| 5,290,739 A | 3/1994 | Hickman |
| 5,346,870 A | 9/1994 | Noguchi et al. |
| 5,422,324 A | 6/1995 | Noguchi et al. |

FOREIGN PATENT DOCUMENTS

| | | |
|---|---|---|
| EP | 0 036 462 | 6/1990 |
| EP | 0 873 775 | 10/1998 |
| JP | 2-229763 | 9/1990 |

OTHER PUBLICATIONS

Lachman et al, "High Temperature Monolithic Supports for Automobile Exhaust Catalysis", Ceram Eng.Sci.Proc (1981),2 (5–6) pp. 337–351.
Fukuda et al., Pub. No. US2003/0015829, Jan. 23, 2003.

*Primary Examiner*—John Kim
(74) *Attorney, Agent, or Firm*—Anca C. Gheorghiu

(57) ABSTRACT

The invention is directed at a mullite-aluminum titanate porous diesel particulate filter constituting a porous ceramic body containing, expressed in terms of weight percent of the total body, of 60–90%, preferably 70–80%, most preferably 70% iron-aluminum titanate solid solution having a stoichiometry of $Al_{2(1-x)}Fe_{2x}TiO_5$, where x is 0–0.1, and 10–40%, preferably 20–30%, most preferably 30% mullite ($3Al_2O_3 \cdot 2SiO_2$), and consists essentially, expressed in terms of weigh percent on the oxide basis, of 3 to 15% $SiO_2$, 55 to 65% $Al_2O_3$, 22 to 40% $TiO_2$, and 0 to 10% $Fe_2O_3$, and being useful for filtration of diesel exhaust. The inventive diesel particulate filter exhibits high interconnected open porosity and large median pore size, in combination with high permeability when fired to a temperature of between 1650° to 1700° C., along with high thermal shock resistance and good filtration capability.

11 Claims, 3 Drawing Sheets

MULLITE-ALUMINUM TITANATE DIESEL EXHAUST FILTER

BACKGROUND OF THE INVENTION

The invention relates to a diesel exhaust filter. Specifically the invention relates to a mullite aluminum titanate diesel exhaust filter and a method of making the same.

In the industry cordierite ($2MgO.2Al_2O_3.5SiO_2$) has been the cost-effective material of choice for diesel exhaust aftertreatment applications, such as wall-flow filters, due to its combination of good thermal shock resistance, filtration efficiency, and durability under most operating conditions. However, under certain circumstances cordierite filters are susceptible to damage and have even catastrophically failed. Occasional thermal runaway occurs during uncontrolled regenerations resulting in localized cordierite melting. Another factor contributing to failure occurs when metal impurities from the engine oil, catalytic additives or corroded metal from the exhaust port liners are introduced into the filter during operation. Typically, at temperatures exceeding 1300° C., these metals form oxides which react with the cordierite structure. Evidence of the failed material are usually small holes on the filter where the metal initially deposits and reacts causing corrosion and melting of the material.

Recently, silicon carbide (SiC) wall-flow filters have been made commercially available for diesel exhaust filtration. However, SiC filters are costly to manufacture, and must be segmented due to an inherent high coefficient of thermal expansion (CTE) and poor thermal shock resistance.

Aluminum titanates, in particular mullite aluminum titanate, have been proposed for usage as filters, in particular, as diesel particulate filters in U.S. Pat. Nos. 4,483,944, 4,767,731, 4,855,265, 5,290,739 and EP 0 036 462 and EP 0 873 775. Such bodies, however, are expected to have low permeability, and consequently high pressure drop or back pressure against the engine, due to low porosity or fine pore size; or in other cases, to have porosities and pore sizes so large that the bodies would be expected to exhibit poor filtration efficiency in removal of particles from a gas stream.

A need therefore exists to have a mullite aluminum titnate diesel particulate filter with higher permeability than has been achieved up to now, while at the same time with useful filtration efficiency, low thermal expansion, high heat capacity, high thermal shock resistance, high mechanical strength, and increased durability during thermal cycling.

SUMMARY OF INVENTION

A key aspect of the present invention is a mullite-aluminum titanate ceramic article of high interconnected porosity and large median pore size, in combination with high permeability which is capable of employment as a filter for diesel exhaust for its low pressure drop and low back pressure against the engine. Concurrently, the inventive article exhibits low thermal expansion, high heat capacity, high thermal shock resistance and high mechanical strength along with useful filtration efficiency and increased durability during thermal cycling.

In particular the present invention relates to a diesel exhaust particulate filter comprising a plugged, wall-flow honeycomb filter body composed of porous ceramic material and having a plurality of parallel end-plugged cell channels traversing the body from a frontal inlet end to an outlet end thereof. The porous ceramic contains, expressed in terms of weight percent of the total body, of 60–90%, preferably 70–80%, most preferably 70% iron-aluminum titanate solid solution having a stoichiometry of $Al_{2(1-x)}Fe_{2x}TiO_5$, where x is 0–0.1, and 10–40%, preferably 20–30%, most preferably 30% mullite ($3Al_2O_3.2SiO_2$), and consists essentially, expressed in terms of weigh percent on the oxide basis, of 3 to 15%, preferably 6 to 12% $SiO_2$, 55 to 65%, preferably 57 to 61% $Al_2O_3$, 22 to 40%, preferably 26 to 35% $TiO_2$, and 0 to 10%, preferably 0.5 to 5% $Fe_2O_3$.

Properties of the inventive structures generally include a porosity of 35% to 55%, preferably 40 to 50% by volume; a median pore size of 8 to 20 micrometers, preferably 10 to 15 micrometers; a permeability of at least $0.30\times10^{-12}$ $m^2$, preferably 0.33 to $1.00\times10^{-12}$ $m^2$ when fired to a temperature of between 1650° to 1700° C.; an increment in a linear dimension of less than 1% after the filter has been exposed one hundred times to thermal cycling at a temperature of 200° to 1100° C. in a time of 7 minutes, and cooling from 1100° to 200° C. in a time of 7 minutes; a CTE, as measured from room temperature to 1000° C. of 5 to $15\times10^{-7}$/° C., preferably 5 to $10\times10^{-7}$/° C.; a heat capacity of at least 3.2 $J\,cm^{-3}K^{-1}$, preferably at least 3.9 $J\,cm^{-3}K^{-1}$ at 500° C.; and, a four-point modulus of rupture as measured on a solid rod of circular cross section of at least 500 pounds per square inch, preferably 800 pounds per square inch.

Another aspect of the invention is a method of making the diesel particulate filter which includes forming a mixture of powdered raw materials selected to obtain a ceramic article consisting essentially, expressed in terms of weigh percent on the oxide basis, of 3 to 15% $SiO_2$, 55 to 65% $Al_2O_3$, 22 to 40% $TiO_2$, and 0 to 10% $Fe_2O_3$; shaping the mixture into a green ceramic article, preferably by extrusion into a honeycomb having an inlet and outlet end and a multiplicity of cells extending from inlet end to outlet end, the cells having porous walls; and, firing the green ceramic article to a temperature of between 1650° to 1700° C. for a duration of time sufficient to produce a mullite-aluminum titanate.

DETAILED DESCRIPTION OF INVENTION

Figure 1:
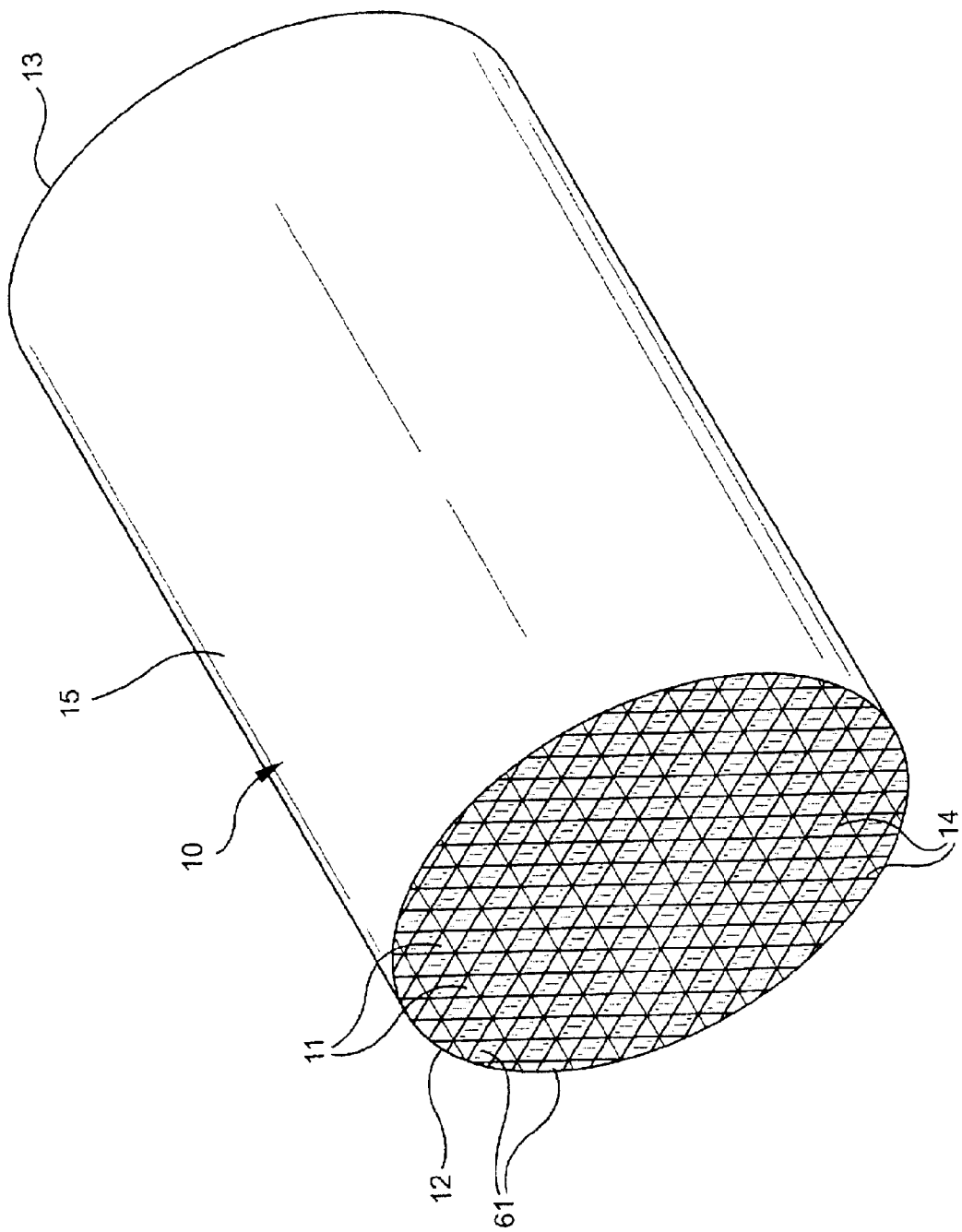
FIG. 1 is a schematic of a diesel particulate filter of the present invention.

A wall-flow filter for diesel exhaust purification according to the present invention is shown in FIG. 1. The filter structure 10 is composed of a honeycomb body 15 having an inlet end 12, an outlet end 13, and a plurality of cells 11 extending in parallel between the inlet end 12 and the outlet end 13. The cells 11 have porous walls 14 and contain plugs 61 at one end only, either at the inlet end 12 or outlet end 13. Plugs 61 are arranged in a checkered pattern such that exhaust which enters the filter structure 10 through open cells 11 at inlet end 12 is forced to pass through porous walls 14 in order to exit outlet end 13.

Figure 2:
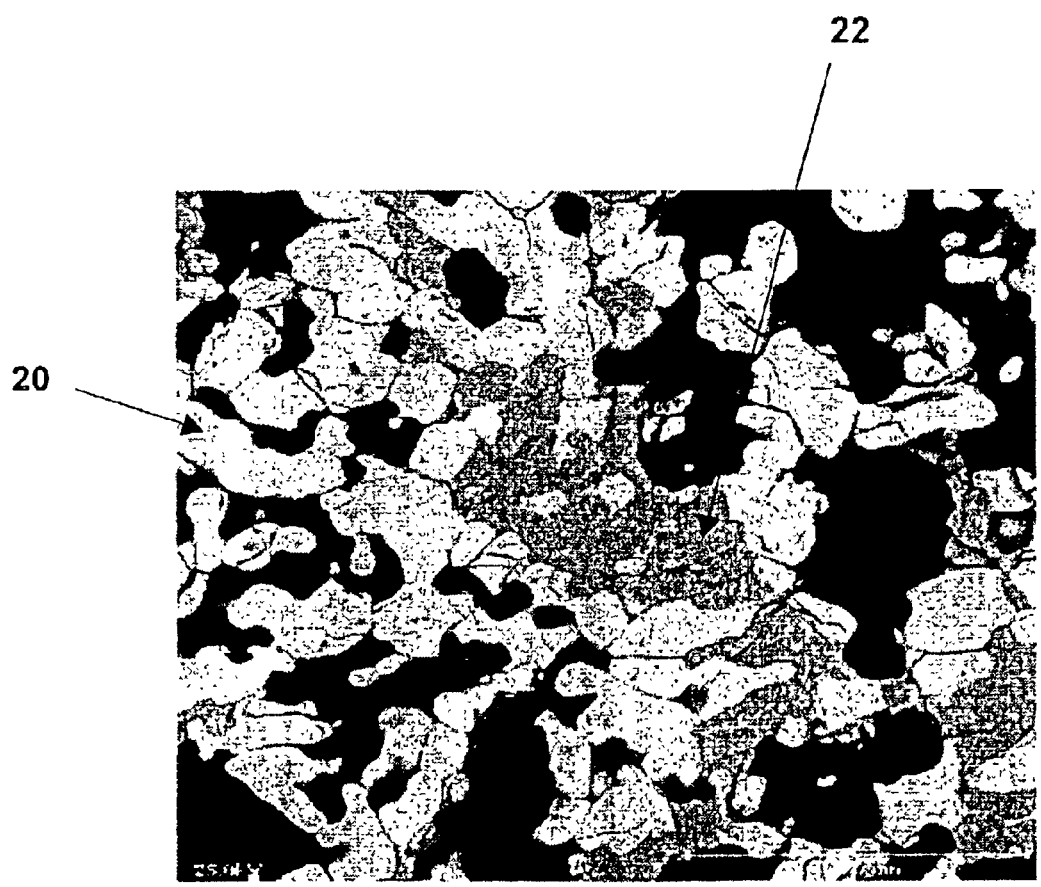
FIG. 2 is a SEM photograph at a 500× magnification representative of the microstructure of the inventive structures.

The honeycomb body 15 of filter structure 10 comprises a porous ceramic material consisting essentially of two crystal phases; viz., iron-aluminum titanate solid solution having a stoichiometry of $Al_{2(1-x)}Fe_{2x}TiO_5$, where x is 0–0.1 and mullite having a stoichiometry of $3Al_2O_3 \cdot 2SiO_2$. A representative SEM photograph at a 500× magnification of the microstructure is shown in FIG. 2 in which the aluminum titanate phase is represented by numeral 20 and the mullite phase is represented by numeral 22.

As known in the art (see U.S. Pat. No. 4,855,265) aluminum titanate tends to show structural instability at high temperatures between 800° and 1300° C. Isomorphic substitution of iron (Fe) for the aluminum (Al) within the aluminum titanate phase is found to improve the stability of the material against decomposition. Therefore, iron oxide ($Fe_2O_3$) may be added in the present invention.

Accordingly, the composition of the articles of the present invention, consists essentially, expressed in weight percent based on oxides, of 3 to 15%, preferably 6 to 12% $SiO_2$; 55 to 65%, preferably 57 to 61% $Al_2O_3$; 22 to 40%, preferably 26 to 35% $TiO_2$; 1 to 10%, preferably 0.5 to 5% $Fe_2O_3$. Traces of a glassy phase may be present, along with traces of unreacted of alumina ($Al_2O_3$) and titania ($TiO_2$) if the structures are fired below 1650° C.

The composition may also expressed in terms of weight percent of the total body, of 60–90%, preferably 70–80%, most preferably 70% iron-aluminum titanate solid solution having a stoichiometry of $Al_{2(1-x)}Fe_{2x}TiO_5$, where x is 0–0.1, and 10–40%, preferably 20–30%, most preferably 30% mullite ($3Al_2O_3 \cdot 2SiO_2$).

Aluminum titanate has a high melting point of 1860° C., and a highly anisotropic thermal expansion (i.e., widely differing expansions along the crystallographic axes) of about $-29 \times 10^{-7}/°$ C. along the a-axis, about $103 \times 10^{-7}/°$ C. along the b-axis, and about $201 \times 10^{-7}/°$ C. along the c-axis. The extreme anisotropy causes the formation of internal stress within large aluminum titanate grains. This results in severe microcracking as the material cools which is attributed to its low coefficient of thermal expansion. Larger grain growth and subsequent microcracking, however, produce a low strength material.

The addition of mullite as a second phase, serves to increase the strength (modulus of rupture) and balance the CTE. Specifically, mullite improves the overall strength of the final body by containment of grain growth and microcrack propagation. The resulting mullite-aluminum titanate article exhibits microcrocracking and a very low CTE, leading to high thermal shock resistance. Microcracked bodies tend to bias the CTE towards the most negative CTE component because the opening of microcracks on cooling accommodates the normal positive components.

The inventive filters have desired properties suitable for low pressure drop and back pressure against the engine, and optimum efficiency. These properties include high interconnected porosity, large median pore size, and narrow pore size distribution, in combination yielding high permeability, while at the same time still maintaining a low coefficient of thermal expansion, high heat capacity, high thermal shock resistance and high mechanical strength, coupled with high durability during repeated thermal cycling. The desired properties are obtained by a careful selection of raw materials with specific particle size restrictions, and exposing a structure formed therefrom to specific heating requirements, as will become apparent from a description herein below.

The open porosity, as measured by mercury porosimetry, is about 35% to 55% by volume, and preferably about 40% to 50% by volume. The median pore size, also as measured by mercury porosimetry, is about 8 to 20 micrometers, and preferably about 10 to 15 micrometers.

The permeability of air under an applied pressure through the structure in the present invention was measured on the fired ribbon or pieces of cell wall using a Perm Automated Porometer® Version 6.0 (Porous Materials, Inc., Ithaca, N.Y.). The value of the permeability is obtained as follows. A piece of fired cell wall is mounted with epoxy onto a disc-shaped sample holder which has a circular opening. The epoxy is applied around the perimeter of the opening such that the sample covers the opening and such that no air can pass through the opening without passing through the sample, and such that the area of the sample through which the air passes is very nearly the same as the area of the circular opening of the sample holder. The sample is then placed in the chamber of the automated porometer and a differential air pressure is applied across the sample. The volumetric air flow on the outlet end of the sample is measured as a function of the pressure applied to the inlet face of the sample. The specific permeability, k, is then computed from the following relation:

$$k = \frac{\eta Q L}{AP}$$

where $\eta$ is the viscosity of air at room temperature in units of megapascal seconds, L is the thickness of the sample in units of meters, Q is the uniaxial volume flow rate of air through the sample in cubic meters per second, A is the area through which air is allowed to pass through the sample, approximately equal to the area of the opening of the sample holder, in units of square meters, and P is the differential pressure across the thickness of the sample in units of megapascals. The permeability, is thus expressed in units of square meters, $10^{-12}$ $m^2$. For low pressure drop and low back pressure against the engine, accordingly the permeability is at least about 0.30 to $1.00 \times 10^{-12}$ $m^2$, preferably 0.33 to $1.00 \times 10^{-12}$ $m^2$.

While the inventive structures have a high interconnected porosity and a large median pore size, there is still maintained a low coefficient of thermal expansion, high heat capacity, high thermal shock resistance and high mechanical strength. The coefficient of thermal expansion (CTE), as measured by dilatometry, from room temperature (22° C.) to 1000° C. is between 5 and $15 \times 10^{-7}/°$ C., preferably between 5 and $10 \times 10^{-7}/°$ C. The structures exhibit a four-point modulus of rupture as measured on a solid rod of circular cross section of at least 500 pounds per square inch (psi) and preferably at least 800 psi. In experiments after thermal cycling at 1000° C. for fifty cycles, the strength loss is less than 15%.

In further experiments carried out at high temperatures between 600° C. and 1100° C., the heat absorbed by the inventive structures per unit volume is estimated to be about 25% higher than current commercially available cordierite diesel particulate filters. This indicates a high heat capacity which means that the temperature in the filter during an uncontrolled regeneration will be lower for structures made according to the present invention than for cordierite, for the same part design (porosity, cell density, and wall thickness). The heat capacity as measured at 500° C. is greater than 3.2 J $cm^{-3}$ $K^{-1}$, and preferably at least 3.9 J $cm^{-3}$ $K^{-1}$. The highest exotherm observed at the highest level of soot loading (20 g/L) was no greater than about 1010° C. This is remarkable considering that exotherms as high as 1400° C. have been observed with current cordierite diesel particulate filters.

Figure 3:
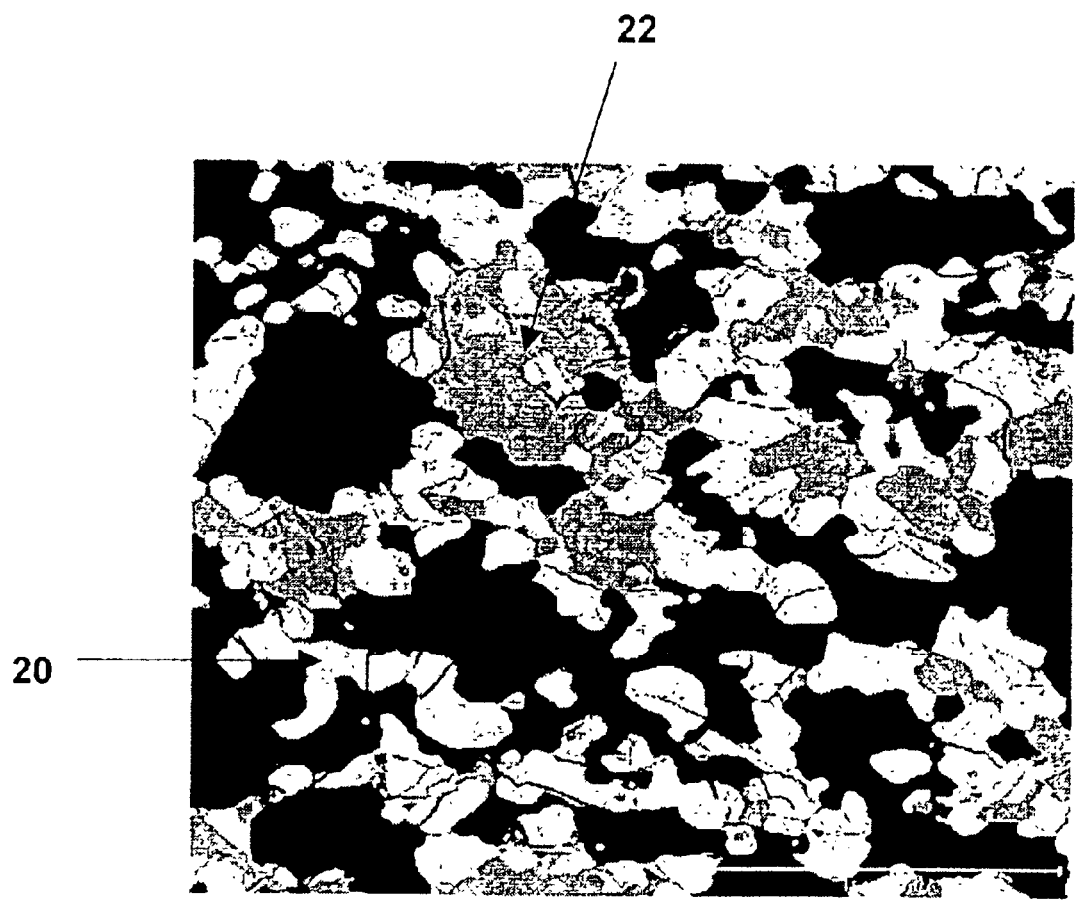
FIG. 3 is a SEM photograph at a 500× magnification representative of the microstructure of the inventive structures after thermal cycling tests.

A further advantage of the inventive structures is increased durability during thermal cycling. In experiments performed, a heat curve in a thermal cyclic test consists of a temperature rising from 200° C. to 1100° C. in 7 minutes and cooling from 1100° C. to 200° C. in 7 minutes. After one hundred times of exposure this heat cycle, the growth observed was less than 1%. The size of the samples tested were measured with a super micrometer before and after testing. FIG. 3 is an SEM photograph at a 500× magnification of the same sample depicted in FIG. 2 after undergoing thermal cycling between 200° C. to 1100° C. at 100 times. The mullite phase 22 remains intact.

A still further advantage of the inventive structures is increased ash resistance. Metal oxide "ash" particles exist in diesel exhaust and are not combustible; therefore, cannot be easily removed during regeneration, like carbon soot. If filter temperatures during regenerations reach sufficiently high values (i.e., >1200° C.) these ash particles may sinter to the filter material and undergo chemical reactions.

In the present invention ash resistance was evaluated using diesel ash and particulate $Fe_2O_3$. The experiments involved obtaining samples from a honeycomb structure of approximately 30 mm×20 mm×5 mm. A thin layer of ash or $Fe_2O_3$ of known weight per unit area was applied to the surface of the samples. The typical loading was about 0.011 grams/$cm^2$ in all cases. The loading was chosen to simulate the amount of ash that would accumulate on a standard 5.66-inch diameter, 6-inch long filter with 200 cells/$inch^2$ and a wall thickness of 0.018 inches after approximately 100,000 km of driving.

The ash/$Fe_2O_3$-coated samples were placed into furnaces that had been pre-heated to a desired temperature, held in the furnace for one hour, then removed and allowed to cool to room temperature. The tests were conducted at 1000°, 1100°, 1300° and 1400° C. Samples were then visually and optically examined for extent of reaction under a stereomicroscope. The one-hour hold time at temperature is believed to be on the order of the cumulative time that the filter will experience temperatures>1000° C. during its lifetime. This is based on 600 regenerations in the filter's lifetime, of which about 10% may be uncontrolled regenerations that might create temperatures in excess of 1000° C. for about one to two minutes per uncontrolled regeneration.

The structures were found to be highly resistant to both diesel ash and particulate $Fe_2O_3$. No sintering or reactions were observed up to 1400° C. Also, as previously described the high heat capacity associated with the inventive materials, reduces the magnitude of the exotherm or temperature increase in the filter during regeneration. Lower exotherms result in less sintering of the metal oxide ash, and less reaction of the ash with the filter, thus increasing the lifetime of the filter.

To obtain mullite aluminum titanate diesel particulate filters as have been described, it has been discovered that a careful method of fabrication must be followed. This method involves the careful selection of specific raw materials having tailored particle size distributions.

The raw materials include (1) oxide sources that react to form the aluminum titanate and mullite phases, and/or (2) partially or completely pre-reacted aluminum titanate and mullite powders. All starting raw materials are chosen to limit the presence of alkali elements in the composition. Coarse median particle size of the raw materials is necessary for a sufficiently large median pore size and high permeability. Median particle size is the median particle diameter in micrometers based upon a volumetric distribution. It is determined by a particle size analyzer employing the laser diffraction technique, known to those of skill in the art. For partially or completely pre-reacted aluminum and mullite powder, the median particle size of the batched constituents is at least about 15 micrometers, preferably at least about 20 micrometers, and more preferably at least about 35 micrometers. Of preference in terms of raw materials, however, are oxide sources that react to form the aluminum titanate and mullite phases. Such advantageous raw materials include silica ($SiO_2$), alumina ($Al_2O_3$), and titania ($TiO_2$).

The alumina-forming source is a powder which, when heated to a sufficiently high temperature in the absence of other raw materials, yields substantially pure aluminum oxide. Suitable alumina-forming sources include alpha-alumina, a transition alumina such as gamma-alumina or rho-alumina, boehmite, aluminum hydroxide, and mixtures thereof. The alumina-forming source is chosen to be of tabular morphology with a particle size sufficiently large to obtain the described porosity, while at the same time develop microcracking in the final structure. Accordingly, the particle size of the alumina source is between about 5 to 25 micrometers, and preferably between about 10 to 15 micrometers. A preferred source of alumina is Alutab® available from Alcan Chemical Limited, Oxon, England.

The preferred silica-forming source in the present invention is quartz, such as Silverbond® 200 available from Unimin Corporation of Canaan, Conn. It has been discovered that the use of quartz plays an important role in the formation of porosity as described and the unique microstructure of the inventive structures. Other silica-forming sources include cristobalite, non-crystalline silica such as fused silica or sol-gel silica, zeolite, and diatomaceous silica. The use of kaolin, as a source of silica, is discouraged in the present invention. This is because kaolin negatively impacts the porosity and microstructure, as well as promoting poor cycling stability. The median particle size of the silica source is between about 5 to 20 micrometers, and preferably between about 8 to 15 micrometers.

The titania-forming source is preferably, but not limited to, rutile, such as Titanox Kronos® 3020, available commercially from Kronos, Inc. of Cranbury, N.J. The median particle size of the titania-forming source is important to avoid entrapment of unreacted oxide by the rapidly growing nuclei in the structure. According the median particle size is between about 4 to 20 micrometers, and preferably between about 8 to 16 micrometers.

The preferred source for iron oxide ($Fe_2O_3$) is iron titanium oxide having a particle size of between about 5 to 30 micrometers, and preferably between about 14 to 26 micrometers. A most preferred example is llmenite available commercially from Atlantic Equipment Engineers of Bergenfield, N.J. Ilmenite is preferred because of the propensity for liquid formation at 1100° C. which improves the reaction to form the iron stabilized aluminum titanate phase. In the present invention isormorphic substitution of iron for the aluminum within the aluminum titanate phase is limited to a range between about 0–10 mole %, preferably about 8 mole %. This would account for an iron oxide addition of about 0% to 5.9% by weight, preferably up to 4.8% by weight.

In the process of the present invention, an advantage resides is the absence of a pore forming agent, such as graphite, in the raw material mixture. A pore former is a fugitive particulate material which evaporates or undergoes vaporization by combustion during drying or heating of the green body to obtain a desired, usually larger porosity and/or coarse median pore diameter.

A number of benefits flow in the absence of a pore former, including reduced firing times, reduced variability in physical properties, such as back pressure and CTE, and reduced gradients in these properties between the inner and outer portions within the structure. That being said, a pore former may be optionally included into the raw materials batch if so desired.

Raw materials are blended together with organic constituents that may include plasticizers, lubricants, binders, and solvents. Methyl cellulose is used as an organic binder which is later burned-off during firing. Oleic acid is preferably used as a dispersant. Sodium stearate is not recommended due to contamination from the sodium. Diglycol stearate may be used but typically leads to poor knitting during extrusion, resulting in crack formation during firing. If diglycol stearate is used, addition of approximately 1–2% by weight polyethylene glycol is required to serve as a lubricant. Water may also optionally be added as a solvent.

The mixture is then shaped into a green honeycomb body, such as by extrusion, optionally dried, and fired at a temperature and for a time sufficient to form the final product structure. The firing may be conduced in an electrically heated furnace or gas kiln at rates ranging from 10–200° C./hr over various temperature intervals to a maximum temperature of 1650–1700° C. over a period of 25–30 hours, and cooled by shutting off power to the furnace. In a preferred embodiment the firing schedule is as follows: heating from room temperature (22–25° C.) to 1500°–1600° C. over a period of about 8 to 10 hours, with a hold at top temperature of about 4 to 8 hours, followed by heating over a period of about 2 to 3 hours to a top temperature of 1650° to 1700° C., with a hold thereat of about 30 to 60 minutes, followed by a ramp down to a temperature of about 1575° to 1600° C. over a period of about 1 hour, with a hold thereat of about 4 to 5 hours. The short excursion to top temperature is necessary for phase and microcracking development, low shrinkage (<5%), along with large interconnected open porosity, large median pore diameter and high permeability.

A representative example of a diesel particulate filter provided in accordance with the invention, and the performance advantages resulting therefrom, may be better understood from the following illustrative example, which is not intended to be limiting.

EXAMPLE

About 1% by weight (of the total ceramic materials therein) oleic acid lubricant/extrusion aid was mixed with about 8.36% by weight, Silverbond® 200 silica for about 10 to 15 minutes. The remainder of the batch ceramic materials consisting essentially of: 58.46% by weight Alutab® alumina, 30.14% by weight Rutile Kronos® 3020 titania, and 3.13% by weight Ilmenite® iron titanium oxide were dry blended with (as weigh percent of the total ceramic materials therein) 4% methyl cellulose plasticizer/binder. The mixture was plasticized with water in a mix-muller, and further plasticized and deaired by pre-extrusion into spaghetti-like masses. Thereafter the fully plasticized and compacted batch was extruded into honeycomb green shapes, dried for about 15 minutes in a dielectric oven, transferred to a regular oven for drying overnight, and then fired according to preferred schedule described herein above.

Table I below reports the constituents of the example in terms of weight percent on the oxide basis and also the phase assemblage. Table II reports the physical properties measured thereon. The large density of 3 g/cm$^3$ is indicative of a high heat capacity body. The high permeability at 0.33×10$^{-12}$ m$^2$ supports a low pressure drop and consequently a low back pressure against the engine. No deformation in the structure was observed below 1700° C.

It should be understood that while the present invention has been described in detail with respect to certain illustrative and specific embodiments thereof, it should not be considered limited to such but may be used in other ways without departing from the spirit of the invention and the scope of the appended claims.

TABLE 1

| Phase Assemblage | Weight percent of total body |
|---|---|
| Iron-Aluminum Titanate Solid Solution | 70% |
| Mullite | 30% |

| Oxide Composition | Weight percent of oxides |
|---|---|
| $Al_2O_3$ | 58.46% |
| $TiO_2$ | 30.14% |
| $SiO_2$ | 8.36% |
| $Fe_2O_3$ | 1.28% |

TABLE 2

| Property | Inventive Example |
|---|---|
| Porosity (% volume) | 41.0 |
| Median pore size (micrometers) | 11.0 |
| Permeability ($10^{-12}/m^2$) | 0.33 |
| CTE (22° C.–1000° C.) $10^{-7}/°$ C. | 13.0 |
| CTE (22° C.–800° C.) $10^{-7}/°$ C. | 7.0 |
| Density (g/ml) | 3.37 |
| Melting point (° C.) | 1700 |
| Shrinkage (%) | 2.0 |
| Thermal Cycling Growth (100 cycles at 1100° C.) | <1% |

What is claimed:

1. A diesel exhaust particulate filter comprising a plugged, wall-flow honeycomb filter body composed of porous ceramic material and comprising a plurality of parallel end-plugged cell channels traversing the body from a frontal inlet end to an outlet end thereof, wherein:

the ceramic contains, expressed in terms of weight percent of the total body, of 60–90% iron-aluminum titanate solid solution having a stoichiometry of $Al_{2(1-x)}Fe_{2x}TiO_5$, where x is 0–0.1, and 10–40% mullite ($3Al_2O_3 \cdot 2SiO_2$), and consists essentially, expressed in terms of weigh percent on the oxide basis, of 3 to 15% $SiO_2$, 55 to 65% $Al_2O_3$, 22 to 40% $TiO_2$, and 0 to 10% $Fe_2O_3$; and, the filter has a porosity of 35% to 55% by volume, a median pore size of 8 to 20 micrometers, a permeability of at least $0.30 \times 10^{-12}$ m$^2$ when fired to a temperature of between 1650° to 1700° C., and, an increment in a linear dimension of less than 1% after the filter has been exposed one hundred times to thermal cycling at a temperature of 200° to 1100° C. in a time of 7 minutes, and cooling from 1100° to 200° C. in a time of 7 minutes.

2. The diesel exhaust particulate filter of claim 1 wherein:

the ceramic contains, expressed in terms of weight percent of the total body, of 70–80% iron-aluminum titanate solid solution having a stoichiometry of $Al_{2(1-x)}Fe_{2x}TiO_5$, where x is 0–0.1, and 20–30% mullite ($3Al_2O_3 \cdot 2SiO_2$), and consists essentially, expressed in terms of weigh percent on the oxide basis, of 6 to 12% $SiO_2$, 57 to 61% $Al_2O_3$, 26 to 35% $TiO_2$, and 0.5 to 5% $Fe_2O_3$; and, the filter has a porosity of 40% to 50% by volume, a median pore size of 10 to 15 micrometers, and a permeability of 0.33 to $1.00 \times 10^{-12}$ m$^2$.

3. The diesel exhaust particulate filter of claim 2 wherein the ceramic contains, expressed in terms of weight percent of the total body, of 70% iron-aluminum titanate solid solution having a stoichiometry of $Al_{2(1-x)}Fe_{2x}TiO_5$, where x is 0–0.1, and 30% mullite ($3Al_2O_3 \cdot 2SiO_2$).

4. The diesel exhaust particulate filter of claim 1 further having a CTE, as measured from room temperature to 1000° C. of 5 to 15×10$^{-7}$/° C., a heat capacity of at least 3.2 J cm$^{-3}$K$^{-1}$ at 500° C., and a four-point modulus of rupture as measured on a solid rod of circular cross section of at least 500 pounds per square inch.

5. The diesel exhaust particulate filter of claim 4 wherein the CTE, as measured from room temperature to 1000° C. is 5 to 10×10$^{-7}$/° C., a heat capacity of at least 3.9 J cm$^{-3}$K$^{-1}$ at 500° C., and a four-point modulus of rupture as measured on a solid rod of circular cross section of at least 800 pounds per square inch.

6. A method of making a structure for use in filtration of diesel exhaust, the method comprising:

a. forming a mixture of powdered raw materials selected to obtain a ceramic article consisting essentially, expressed in terms of weigh percent on the oxide basis, of 3 to 15% $SiO_2$, 55 to 65% $Al_2O_3$, 22 to 40% $TiO_2$, and 0 to 10% $Fe_2O_3$;

b. shaping the mixture into a green ceramic article;

c. firing the green ceramic article to a temperature of between 1650° to 1700° C. for a duration of time sufficient to produce a mullite-aluminum titanate ceramic article having a porosity of 35% to 55% by volume, a median pore size of 8 to 20 micrometers, a permeability of at least 0.30×10$^{-12}$ m$^2$, and, an increment in a linear dimension of less than 1% after the filter has been exposed one hundred times to thermal cycling at a temperature of 200° to 1100° C. in a time of 7 minutes, and cooling from 1100° to 200° C. in a time of 7 minutes.

7. The method of claim 6 wherein the raw materials comprise oxide sources including:

silica ($SiO_2$) having a particle size of 5 to 20 micrometers;

alumina ($Al_2O_3$) having a particle size of 5 to 25 micrometers;

titania ($TiO_2$) having a particle size of 4 to 20 micrometers; and, iron oxide ($Fe_2O_3$) added at about 0 to 6% weight of the total batched raw materials.

8. The method of claim 7 wherein:

the silica ($SiO_2$) has a particle size of 8 to 15 micrometers;

alumina ($Al_2O_3$) having a particle size of 10 to 15 micrometers;

titania ($TiO_2$) having a particle size of 8 to 16 micrometers; and, iron oxide ($Fe_2O_3$) added at about 0 to 5% weight of the total batched raw materials.

9. The method of claim 6 wherein the mixture is shaped by extrusion into a honeycomb having an inlet and outlet end and a multiplicity of cells extending from inlet end to outlet end, the cells having porous walls.

10. The method of claim 9 wherein the cells are plugged at one end only, either at the inlet end or the outlet end of the honeycomb structure.

11. The method of claim 9 wherein the firing step includes heating from room temperature (22–25° C.) to 1500°–1600° C. over a period of about 8 to 10 hours, with a hold at top temperature of about 4 to 8 hours, followed by heating over a period of about 2 to 3 hours to a top temperature of 1650° to 1700° C., with a hold thereat of about 30 to 60 minutes, followed by a ramp down to a temperature of about 1575° to 1600° C. over a period of about 1 hour, with a hold thereat of about 4 to 5 hours.

* * * * *